R. B. DU VAL.

FOLDING PAPER BOX.

APPLICATION FILED APR. 28, 1911.

Reissued Dec. 15, 1914.

13,845.

2 SHEETS—SHEET 1.

Inventor

Raymond B. Du Val

Witnesses

H. C. Polinette

A. L. Weaver

By Hughes, Cushman & Sea

Attorneys

THE NORRIS PETERS CO., PHOTO-LITHO., WASHINGTON, D. C.

R. B. DU VAL.

FOLDING PAPER BOX.

APPLICATION FILED APR. 28, 1911.

Reissued Dec. 15, 1914. 13,845.

2 SHEETS—SHEET 2.

Inventor

Raymond B. Du Val

Witnesses

H. A. Polmette

A. L. Weaver

By Lucyus Cushman & Co

Attorneys

THE NORRIS PETERS CO., PHOTO-LITHO., WASHINGTON, D. C.

UNITED STATES PATENT OFFICE.

RAYMOND B. DU VAL, OF RICHMOND, VIRGINIA.

FOLDING PAPER BOX.

13,845. Specification of Reissued Letters Patent. Reissued Dec. 15, 1914.

Original No. 980,931, dated January 10, 1911, Serial No. 577,983. Application for reissue filed April 28, 1911. Serial No. 624,269.

*To all whom it may concern:*

Be it known that I, RAYMOND B. DU VAL, a citizen of the United States, residing at Richmond, in the county of Henrico and State of Virginia, have invented a new and useful Improvement in Folding Paper Boxes, of which the following is a specification.

This invention relates to paper or pasteboard boxes of that type made of a single folded blank, and has for its object to provide improved means for locking flaps which close the ends of the box, the lock being such that pressure from the inside cannot release the same except by tearing the material.

The invention may be embodied in a variety of forms, some of which are hereinafter shown and described. The flaps and locks are so arranged or distributed that they cover or hold each other, and they may be quickly and easily folded to proper form to set up the box and hold articles in place therein.

The nature of the invention will be more fully understood from the following description and the accompanying drawings in which—

Figure 1:
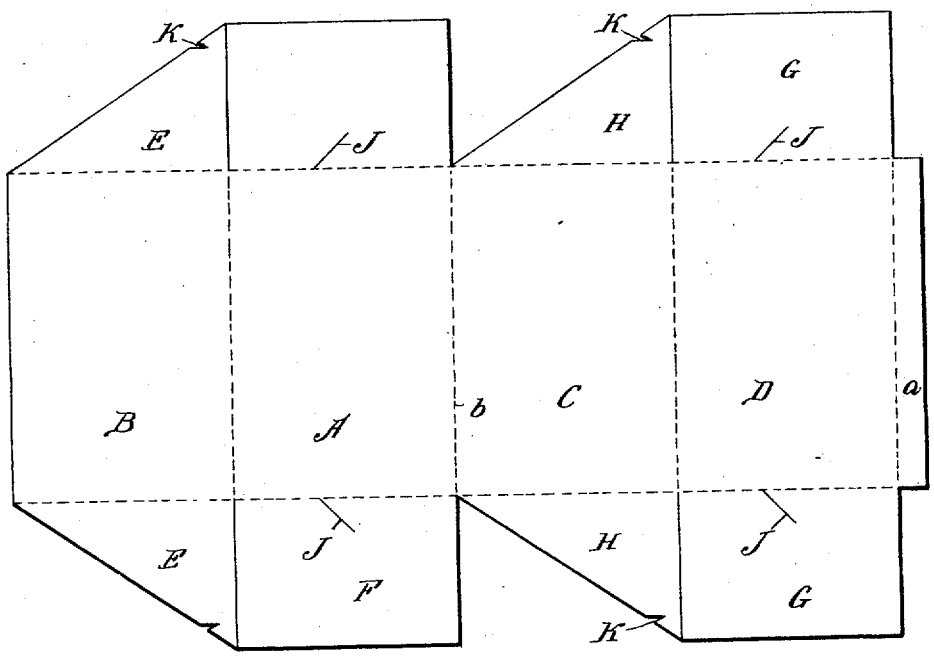
Figure 2:
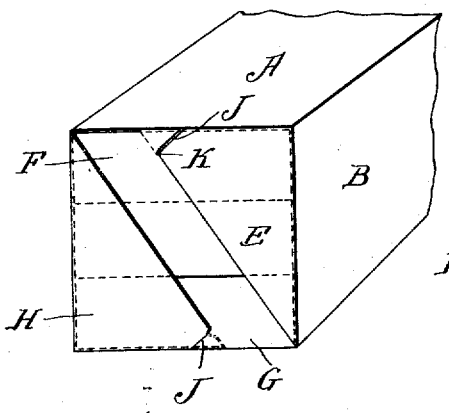
Figure 3:
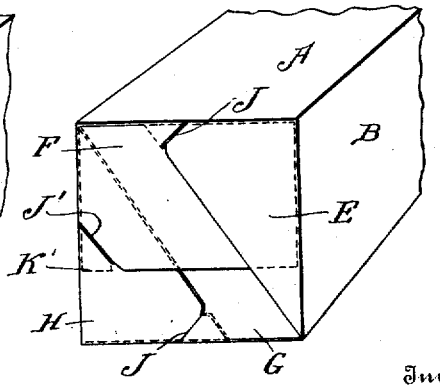
Figure 4:
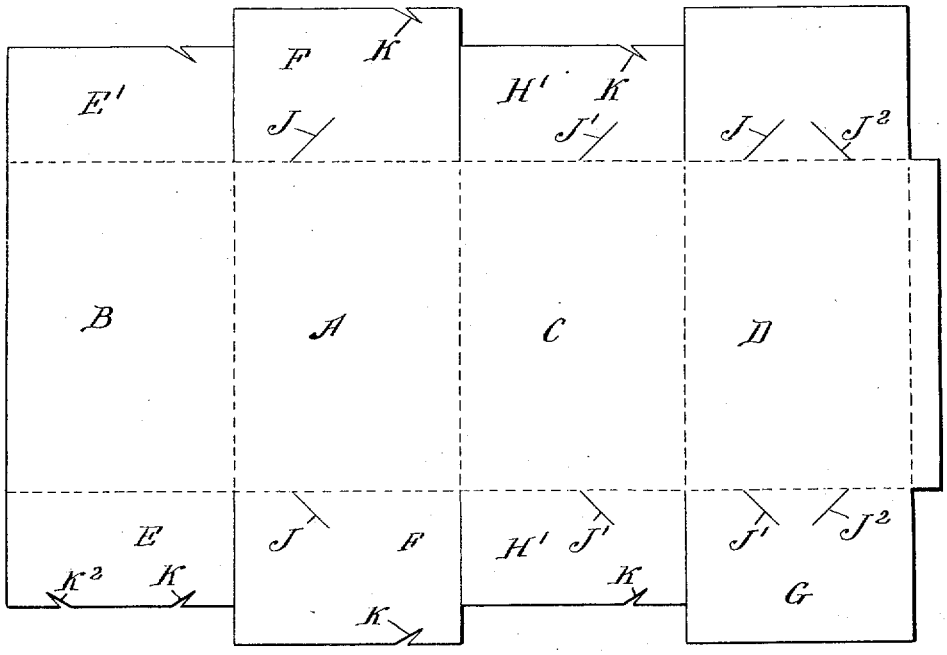
Figure 5:
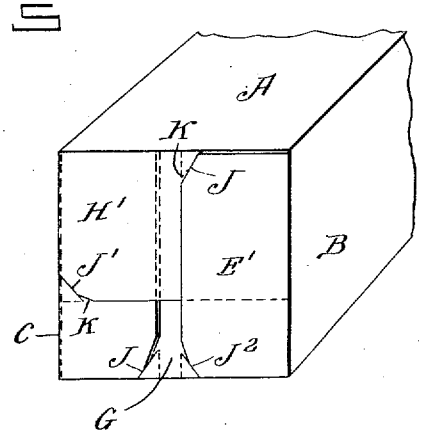

Figure 1 is a plan view of the blank of what I term a two lock box; Fig. 2 is a perspective view of one end of the box, with the flaps in locked relation; Fig. 3 is a perspective view of the end of a modified form, being what I term a three-lock box; Fig. 4 is a plan view of the blank of a modified form, being what I term a four-lock box; Fig. 5 is a perspective view of the end of a box made of the blank shown in Fig. 4.

Referring specifically to the drawings, the boxes illustrated have four sides, indicated at A, B, C, and D, and at one end the blank has a flap *a* which is pasted to the opposite end of the blank. In practice, this pasting will be done when the boxes are supplied to dealers, the blank being folded upon its own middle line *b* so that two sides rest flatly upon the other two sides, the end flaps lying in the same plane, whereby the boxes can be shipped in small compass.

Each end of the box shown in Figs. 1 and 2 is formed by four interlocking flaps. The side A has a square flap F, and the opposite side D has a square flap G. The side B has a triangular flap E, and the side C has a triangular flap H. The flaps F and G have slits J extending diagonally, in position to receive the pointed ends of the triangular flaps E and H, which ends are notched as at K to catch in the ends of the slits.

In setting up and locking the box shown in Figs. 1 and 2 the flap G is first folded in and the opposite flap F is then folded in upon the same. The flaps E and H are then folded in upon the flap F, the tongue or pointed end of the former being engaged in the slit J in the flap F, where it is held by the notch K, and the tongue on the latter being engaged in the slit J in the flap G, where it is also held by the notch K. It will be noticed that the flap F is of less length than the full height of the box, so that it does not cover or obstruct the slit J in the flap G, and consequently the insertion of the tongue or end of the flap H into the slit J in the flap G is permitted, and the notch K is in position to effect the engagement of the end in the slit, at the lower edge of the flap F, as clearly shown in Fig. 2. The inner flaps F and G are thus held by the outer triangular flaps E and H, and internal pressure will not cause the box to open except by tearing the material of the flaps E and H.

In the form shown in Fig. 3 the construction is substantially the same, with the addition, however, that the flap F has a tongue at one corner formed by a notch K′ arranged to engage in a slit J′ made in the triangular flap H; and the manner of folding is somewhat different. That is to say, that flap G is first folded in, then the flap H, then the flap F, and then the flap E. The tongue on the flap H is inserted in the slit J in the flap G, the tongue at the corner of the flap F is inserted in the slit J′ in the flap H, where it is caught at the notch K′, and lastly the tongue on the flap E is engaged in the slit J in the flap F, as in Fig. 2. This box, therefore, has three locks between the flaps, instead of two, as in Fig. 2.

In the form shown in Figs. 4 and 5 the sides A, B, C and D and the end flaps F and G are substantially the same, as in Fig. 3, the flap F having the slit J and the flap H′ having the slit J′ and the flap G having in addition to the slit J an additional slit $J^2$. The other two flaps are modified, one, E′ having tongues at both free corners, produced by notches K and $K^2$, the former of which engages in the slit J in the flap F and the latter of which engages in the slit $J^2$ in the flap G, below the lower edge of the flap F, and the flaps E′ and H′, or at least the former, is made square instead of triangular; and it will be seen that there are four interlocking tongues between the end flaps. In this construction the flap G is first folded in; then the flap H′ which is locked thereto; then the flap F which is locked to the flap H′; and finally the flap E′ which is doubly locked, at one corner to the flap F and at the other corner to the flap G.

These two latter forms of my invention shown in Figs. 3 to 5 are the forms I prefer. I desire to call particular attention to several points in connection with these forms. First, it is to be noted that the slits J, J′ are immediately adjacent the sides of the box, and are inclined each in the same clockwise or counter-clockwise direction with the single exception of the last slit $J^2$ of the four lock box of Fig. 5. By virtue of this placing of the slits immediately adjacent the sides there is a strong resistance of loosening. Especially is this true of the form of Fig. 3 having the triangular flaps on two opposite sides. This in combination with the inclination of the slits aforesaid and the consecutive lapping of the flaps results in an equalization of the strains on the box end, each flap being reinforced in an efficient manner by each of the others, and the strength therefore still further increased. Second, it is to be noted that I have provided a box having a plurality of sides with a flap for each, we will say of *n* consecutive sides, that in the first I have placed a slit J; in the second, third and so forth, except in the *n*th I have placed a slit and provided also a notched tongue K, the notched tongue K of the second flap interlocking in the slit J of the first, the tongue K of the third in the slit J of the second, and so forth, to the *n*th, each consecutive flap being successively lapped over the preceding flap in order. The *n*th flap is lapped last and provided either with one tongue interlocking in the next preceding flap, or two tongues, one as aforesaid and the other interlocking in an additional slit formed in the first flap. Great advantage results here from the fact that the flaps are consecutively lapped and locked. A workman in closing the box turns it in the same direction the while, this direction being counter-clockwise with the forms shown, and the flaps are presented as the box is turned in just the right position for folding over and locking consecutively. A great saving in time results. The advantage of this construction in equalizing the strains on the ends of the box have been heretofore mentioned.

Various other modifications may be made in the scope of the invention, and it may be seen that the invention provides simple means for locking together the end flaps of the four sided box made of a single blank having one pasted edge, and capable of being shipped in flat or knock-down condition; and as compared to boxes made of two blanks or trays, a box constructed according to this invention has the advantage that only a single blank is required, and when the ends of the box are locked they do not have to be tied.

I claim:

1. A box made of a single blank folded to form four sides of the box, two opposite sides having infolded flaps, one of said flaps having two exposed slits and the other having one slit and a notched corner, and the two other opposite sides having flaps folded in upon said flaps and provided with notched tongues interlocking in said slits respectively, one of the last mentioned flaps having a slit in which said notched corner is interlocked.

2. A box made of a single blank folded to form four sides of the box, two opposite sides having flaps folded in one upon the other and each of said flaps having an exposed slit and one of said flaps having a notched corner, and the two other opposite sides having flaps folded in upon said flaps and provided with notched tongues interlocking in said slits respectively, one of the last mentioned flaps having a slit in which said notched corner is interlocked.

3. A box end closure comprising a plurality of flaps, and a plurality of complementary locking elements on the flaps, said flaps being adapted to be successively folded one over the other in regular progression around the box, said locking members being adapted to be successively interlocked whereby to retain said flaps in said folded position.

4. A box end closure comprising a series of flaps adapted to be successively folded one over the other in regular progression around the box, and complementary locking elements on the flaps adapted to be successively interlocked whereby each flap may be secured to its adjacent preceding flap from end to end of the series.

5. A box having a number of sides, and a closure comprising an infolded flap on each side, two like members of a locking element on one of said flaps, two coöperating members of locking elements on a second flap adjoining the first flap on one side, and the two members of a locking element in each of the remaining flaps, said flaps being successively folded one over the other in regular progression around the box and secured by interlocking one of said members on each flap with the coöperating member on the flap immediately preceding, and finally locking the second member on the last flap to be folded with the second coöperating member on the first folded flap.

6. A box having a number of sides, and a closure comprising an infolded flap on each side, a pair of slits in one of said flaps, a pair of notched tongues in a second flap adjoining the slitted flap on one side, and a slit and a notched tongue in each of the remaining flaps, said flaps being successively folded one over the other in regular progression around the box and secured by interlocking the notched tongue on each flap with the slit in the flap immediately preceding, and finally locking the second notched tongue on the last flap to be folded with the second slit in the first folded flap.

Witness my hand this 13th day of April 1911.

RAYMOND B. DU VAL.

Witnesses:
F. D. MACON,
E. P. BUXTON.

Copies of this patent may be obtained for five cents each, by addressing the "Commissioner of Patents, Washington, D. C."